United States Patent [19]

Stoffer et al.

[11] Patent Number: 5,085,559
[45] Date of Patent: Feb. 4, 1992

[54] COMPOSITE VANE

[75] Inventors: Lewis J. Stoffer; Andrew MacGee, both of Cincinnati, Ohio

[73] Assignee: The United States of America as represented by the Secretary of the Air Force, Washington, D.C.

[21] Appl. No.: 509,926

[22] Filed: Apr. 16, 1990

[51] Int. Cl.⁵ ................................................ F01D 5/08
[52] U.S. Cl. ...................................... 416/95; 415/114; 244/134 R
[58] Field of Search ........................ 416/95, 96 R, 224; 415/114, 115, 116; 244/134 R, 134 B, 134 C; 60/39.03

[56] References Cited

U.S. PATENT DOCUMENTS

| | | | |
|---|---|---|---|
| 2,876,970 | 3/1959 | Halbert | 244/134 R |
| 3,269,700 | 8/1966 | Shainess | 416/95 |
| 3,341,114 | 9/1967 | Larson | 230/132 |
| 3,979,903 | 9/1976 | Hull, Jr. et al. | 60/39.09 P |
| 4,022,540 | 5/1977 | Young | 415/9 |
| 4,108,572 | 8/1978 | Platt | 416/230 |
| 4,508,295 | 4/1985 | Cattaneo et al. | 244/134 B |
| 4,732,351 | 3/1988 | Bird | 244/134 D |
| 4,815,940 | 3/1989 | LeShane et al. | 416/241 A |
| 4,944,655 | 7/1990 | Merz | 416/95 |
| 5,011,098 | 4/1991 | McLaren et al. | 244/134 B |

Primary Examiner—John T. Kwon
Attorney, Agent, or Firm—Stanton E. Collier; Donald J. Singer

[57] ABSTRACT

Metal darts are captured either in bonded assembly or in riveted assembly with composite airfoil skins. The darts have a thin fin extending rearward with a dam at its rear end forming a hot air duct on either side of the fin. As hot compressor bleed air is diverted down through the fin duct, heat is transferred forward to the dart leading edge. The fin may contain ripples or other perturbances to improve heat transfer if necessary. Sufficient heat should be transferred to inhibit ice buildup on the final coating that covers the entire airfoil and further provides FOD protection by having a metal leading edge.

7 Claims, 2 Drawing Sheets

COMPOSITE VANE

STATEMENT OF GOVERNMENT INTEREST

The invention described herein may be manufactured and used by or for the Government for governmental purposes without the payment of any royalty thereon.

BACKGROUND OF THE INVENTION

The present invention relates to jet aircraft engines, and, in particular, to inlet guide vanes therein.

In the past, in cold weather operations, the formation of ice on static engine parts caused a problem when the ice broke off and caused damage to downstream engine parts such as compressor blades, etc. It is further known that ice buildup drastically reduces airfoil characteristics whether on static or dynamic parts. Thus there is a need to reduce or eliminate icy buildup on aircraft parts.

In the past, hot air bled from the engine was ducted through channels in the metal vanes. Other schemes to reduce or eliminate ice buildup on metal vanes included electric current applied through a resistive layer, mechanically induced vibrations, sonically induced vibrations, etc.

With the advent of lightweight engine systems, the use of composite materials in the vanes, for example, has produced several problems. Composite materials are not good heat conductors so the use of hot fluids whether gas or liquid are not as effective. Also the composite vanes are more subject to damage from foreign objects (FOD) than equivalent metal vanes.

Several solutions to this have been proposed such as electric heating using a metalized fabric in the surface of the composite vane, fluid heating through a system of capillary tubes under a composite surface, and applying an antifreeze solution through surface holes.

The use of capillary tubes in composite vanes requires that the tubes be within a few hundredths of an inch of the surface because of the poor heat conduction. The proximity of the tubes to the surface may reduce impact resistance to FOD resulting in replacement of the vanes from objects that would not otherwise damage the vane. The use of tubes produces a trade-off between the ability to de-ice and impact resistance to FOD.

Therefore, there is a need for a composite vane having the ability to de-ice and to prevent FOD damage as compared to the devices noted above.

SUMMARY OF THE INVENTION

The present invention sets forth an improved composite vane having an anti-icing and FOD damage control ability.

The improved composite vane is comprised of a metal dart either captured or riveted within the composite airfoil skin with a coating thereon.

The darts have an aerodynamically shaped head with a thin fin extending rearward with a dam at its rear and forming a hot air duct on either side of the fin when the airfoil skins are applied. As the hot compressor bleed air is diverted down through the fin duct, heat is transferred forward to the dart's leading edge having the coat thereon. Because the vane's leading edge is metal FOD damage would be minimized as compared to other designs suggested.

Therefore, one object of the present invention is to provide an improved composite vane having anti-icing and FOD damage control therein.

Another object of the present invention is to provide an improved composite vane wherein the anti-icing control provides for FOD damage control.

Another object of the present invention is to provide an improved composite vane for use in a lightweight jet engine system.

Another object of the present invention is to provide an improved composite vane being easily constructed.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
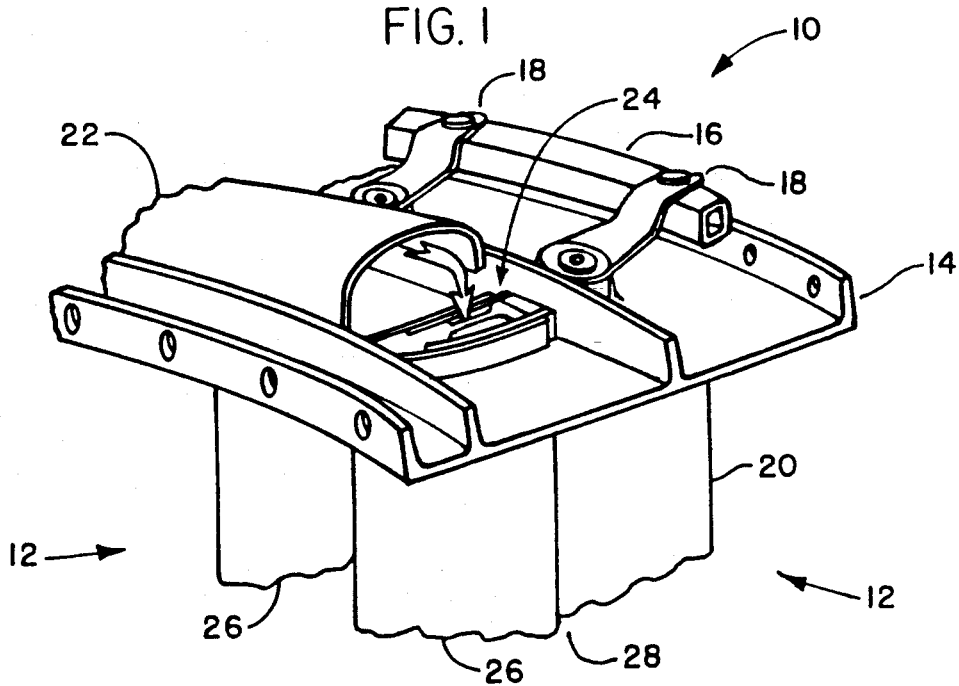
FIG. 1 illustrates by partial view the hot air manifold feeding the improved composite vane of the present invention.

Referring to FIG. 1, a partial view of a compressor stage 10 is shown having adjustable composite inlet guide vanes 12 therein. An outer casing 14 has thereon an actuator ring 16 connected to a plurality of flap levers 18 that rotate composite flaps 20. Also thereon is a hot air manifold 22 that has hot air input from the compressor, for example, that flows into dart ducts 24 of the composite inlet guide vane 26 being fixed between the outer casing 14 and an inner casing, not shown, in a conventional manner such as bonding. The adjustable flap 20 and inlet guide vane 26 are aerodynamically joined at junction 28.

It should be understood that the illustrated embodiment discloses the inventive concept and that this invention may be used in other types of vanes, struts, etc. that are exposed to icing and FOD. In general, the invention may be used in any airfoil that is subject to icing and FOD damage and not subject to stresses that would damage the improved composite vane or similar structure.

Figure 2:
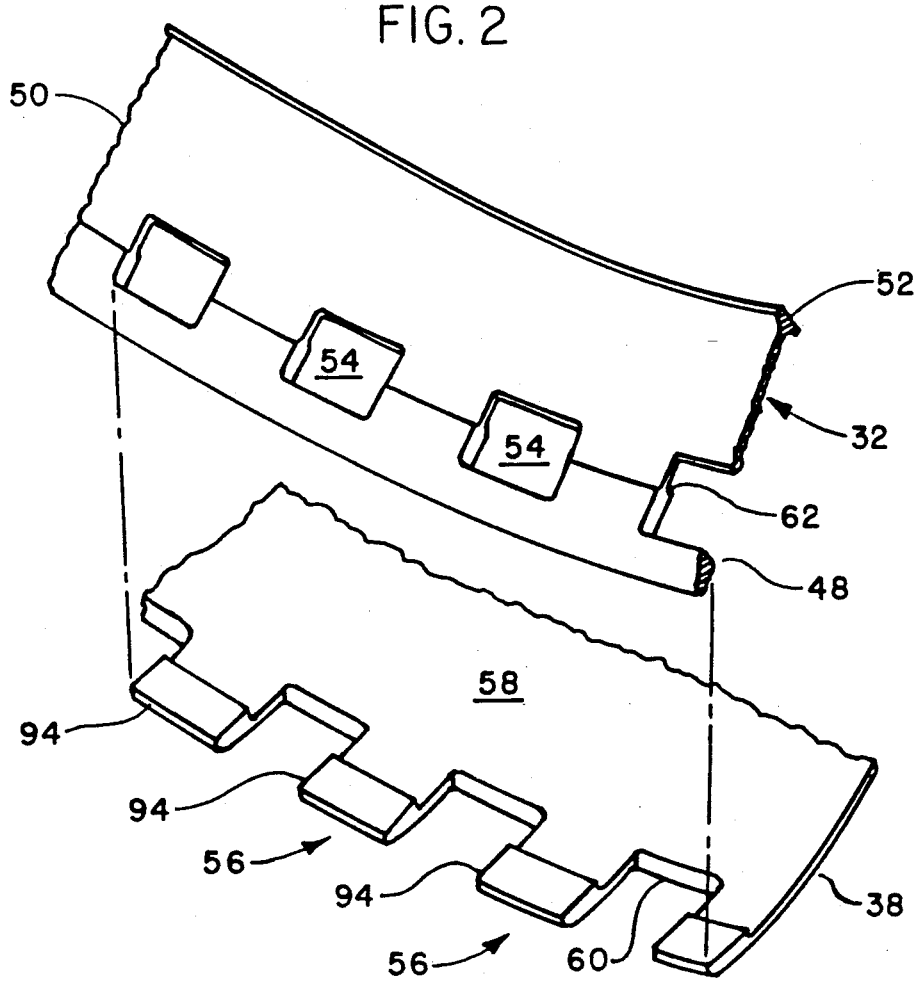
FIG. 2 partially illustrates a first dart with adjacent skin.
Figure 3:
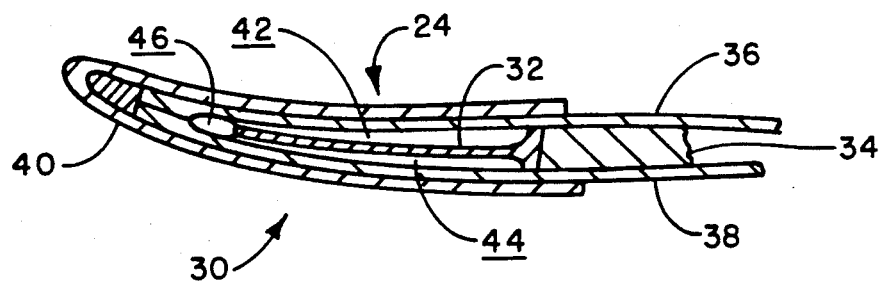
FIG. 3 is a cross section of the first dart in the improved composite vane.

The construction of one embodiment is shown in FIGS. 2 and 3.

FIG. 3 illustrates a partial view of an improved composite inlet guide vane 30 having a metal dart 32, a composite center body 34, a composite upper skin 36, a composite lower skin 38 and a coating 40.

The dart duct 24 is composed of an upper duct 42 and lower duct 44 with an interconnecting duct 46 therebetween.

Metal dart 32 may be made of copper, aluminum, titanium, steel, for example. Referring to FIG. 2, the dart 32 has a leading edge 48, a fin 50, and a dam 52 with a plurality of openings 54 therethrough. Leading edge 48 is aerodynamically shaped like a bullet in cross section.

The lower skin 38 in FIG. 2 has a plurality of bonding tabs 56 which are inserted into the openings 54 of dart 32 and bonded by conventional means to the bonding tabs of the upper skin 36, not shown in FIG. 2. The bonding tabs 56 are of a length less than the length of opening 54 so that the interconnecting duct 46 is formed so that hot air flow between the upper and lower ducts 42 and 44. This feature increases the area of the dart 32 exposed to the hot air. The fin 50 may have ripples or other perturbances to increase heat absorption.

The dart 32 need not be bonded to skins 36 and 38 so that thermal expansion may occur.

The trailing edges of skins 36 and 38 and the center body 34 may be formed into a conventional vane trailing edge or may be formed into the junction 28, FIG. 1, to aerodynamically fit into the adjustable flap 20.

Figure 4:
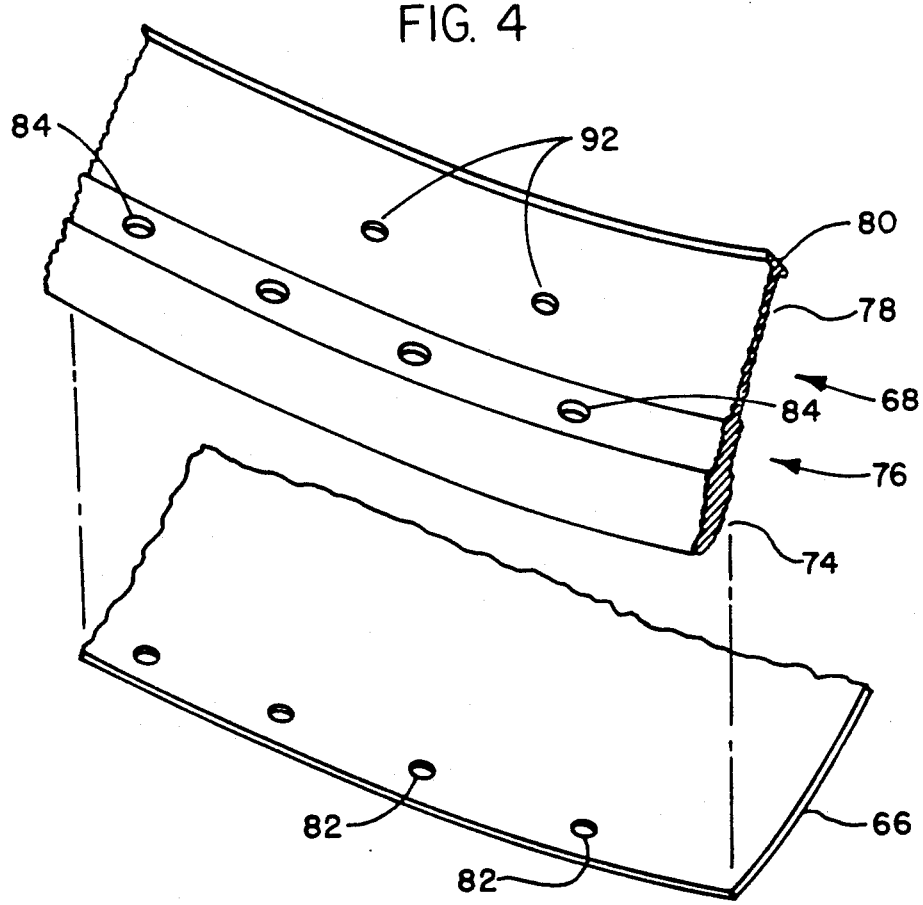
FIG. 4 partially illustrates a second dart with adjacent skin.
Figure 5:
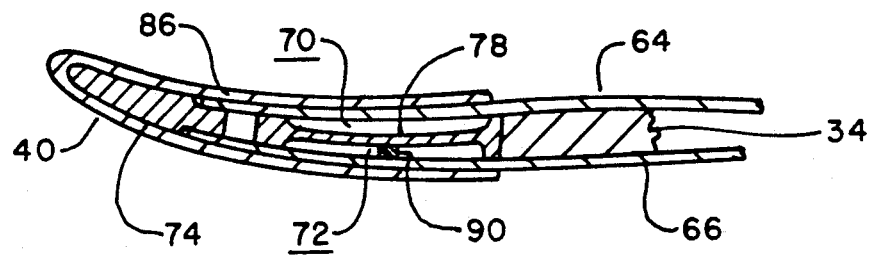
FIG. 5 is a cross section of the second dart in the improved composite vane.

Additional dams such as dam 90 being only one half of a full dam as shown in FIG. 5 may be placed on the fin 78 for support of the skins and have additional channels or holes 92, FIG. 4, therethrough for hot air flow.

The lower skin 38 FIG. 2, has a duct surface 58 which abuts against dams 52 and the leading edge 48 at locations 60 and 62. The same applies to the upper skin 36. The location of tab bonding areas 94 in the area of the leading edge 48 provides strength with the added thickness.

Referring to FIGS. 4 and 5, an additional embodiment is shown wherein an upper skin 64 and a lower skin 66 are riveted together with a metal dart 68 therebetween. As seen in FIG. 5, an upper duct 70 and a lower duct 72 can communicate if holes 92, etc. are placed through the dart 68.

In FIG. 4, the dart 68 has a leading edge 74, a riveting section 76, a fin 78 and a dam 80. The lower skin 66 has rivet holes 82 that would coincide with rivet holes 84 in the riveting section 76. A rivet 86 would connect skins 64 66 and the dart 68 together.

The riveting section 76 is constructed such that the skins when connected provide a smooth surface between the leading edge 74 and the skins and further provides for hot air ducts 70 and 72 to be formed between the dart 68 and the skins 64 and 66. A conventional coating is applied over the leading edge 74 and the skins 64 and 66.

Clearly, many modifications and variations of the present invention are possible in light of the above teachings and it is therefore understood, that within the inventive scope of the inventive concept, the invention may be practiced otherwise than specifically claimed.

What is claimed is:

1. An improved composite airfoil, said improved composite airfoil providing anti-icing and foreign object damage protection, the improvement comprising:
   a means for conducting heat to a leading edge of said airfoil, said means being composed of a metal, said means having composite skins thereon such that a plurality of air ducts are provided along the length of said means for conducting heat of said improved composite airfoil, said means for conducting heat being a metal dart comprising:
   a leading edge, said leading edge having an aerodynamic shape;
   a fin, said fin being connected to said leading edge at a rear section of said leading edge;
   at least one dam, said at least one dam being connected to a rearward edge of said fin and extending perpendicularly therefrom in both directions; and
   a plurality of opening means through said dart for the purpose of connecting the composite skins together, said composite skins and said dart forming a plurality of longitudinal hot air ducts.

2. An improved composite airfoil as defined in claim 1 wherein the composite skins comprise an upper skin and lower skin, each of the skins having a row of a plurality of tabs for bonding the upper skin to the lower skin through said openings.

3. An improved composite airfoil as defined in claim 1 wherein the composite skins comprise an upper skin and a lower skin, each of the skins having a row of a plurality of rivet holes for riveting the skins through said openings in said dart.

4. An improved composite airfoil as defined in claim 1 wherein said dart has a plurality of holes through said fin for the purpose of hot air flow between the air ducts.

5. An improved composite airfoil as defined in claim 2 wherein said fin further includes perturbances thereon for enhancing heat flow to said leading edge of said dart.

6. An improved composite airfoil as defined in claim 1 wherein said airfoil is an inlet guide vane for a jet engine.

7. An improved composite airfoil as defined in claim 1 wherein said airfoil is a strut.

* * * * *